(12) United States Patent
Funada et al.

(10) Patent No.: US 8,296,930 B2
(45) Date of Patent: Oct. 30, 2012

(54) METHOD FOR MANUFACTURING A MAGNETORESISTIVE SENSOR HAVING A FLAT SHIELD

(75) Inventors: Shin Funada, Pleasanton, CA (US); Quang Le, San Jose, CA (US); Thomas L. Leong, San Jose, CA (US); Jui-Lung Li, San Jose, CA (US); Chang-Man Park, Mountain View, CA (US); Ning Shi, San Jose, CA (US); Hicham M. Sougrati, Burlingame, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 315 days.

(21) Appl. No.: 12/645,323

(22) Filed: Dec. 22, 2009

(65) Prior Publication Data

US 2011/0146061 A1    Jun. 23, 2011

(51) Int. Cl.
*G11B 5/127* (2006.01)
*H04R 31/00* (2006.01)

(52) U.S. Cl. ............... 29/603.14; 29/603.12; 29/603.13; 29/603.15; 29/603.16; 29/603.18; 216/62; 216/65; 216/66; 360/324.1; 360/324.11; 360/324.12; 360/324.2; 451/5; 451/41

(58) Field of Classification Search ............... 29/603.07, 29/603.12–603.16, 603.18; 216/62, 65, 66; 360/324.1, 324.11, 324.12, 324.2; 451/5, 451/41

See application file for complete search history.

(56) References Cited

U.S. PATENT DOCUMENTS

| | | | |
|---|---|---|---|
| 6,723,655 B2 * | 4/2004 | Park et al. | 438/742 |
| 7,094,130 B2 | 8/2006 | Cyrille et al. | |
| 7,419,891 B1 * | 9/2008 | Chen et al. | 438/496 |
| 7,446,981 B2 | 11/2008 | Shintani et al. | |
| 7,522,391 B2 | 4/2009 | Freitag et al. | |
| 7,530,158 B2 | 5/2009 | Araki et al. | |
| 7,536,776 B2 | 5/2009 | Yoshida et al. | |
| 7,639,456 B2 * | 12/2009 | Hong et al. | 360/324.1 |
| 2006/0101636 A1 | 5/2006 | Cyrille et al. | |
| 2006/0136543 A1 | 6/2006 | Lutz et al. | |
| 2006/0231930 A1 | 10/2006 | Araki et al. | |
| 2006/0256482 A1 | 11/2006 | Araki et al. | |
| 2006/0279881 A1 | 12/2006 | Sato | |
| 2006/0292705 A1 | 12/2006 | Hegde et al. | |
| 2007/0081279 A1 | 4/2007 | Hong et al. | |
| 2007/0230061 A1 | 10/2007 | Endo et al. | |
| 2008/0274623 A1 | 11/2008 | Guthrie et al. | |

FOREIGN PATENT DOCUMENTS

JP    2008/186543    8/2008

* cited by examiner

*Primary Examiner* — Paul D Kim
(74) *Attorney, Agent, or Firm* — Zilka-Kotab, PC

(57) ABSTRACT

A method for manufacturing a magnetoresistive sensor that results in the sensor having a very flat top magnetic shield. The process involves depositing a plurality of sensor layers and then depositing a thin high density carbon CMP stop layer over the sensor layers and forming a mask over the CMP stop layer. An ion milling is performed to define the sensor. Then a thin insulating layer and magnetic hard bias layer are deposited. A chemical mechanical polishing is performed to remove the mask and a reactive ion etching is performed to remove the remaining carbon CMP stop layer. Because the CMP stop layer is very dense and hard, it can be made very thin. This means that when it is removed by reactive ion etching, there is very little notching over the sensor, thereby allowing the upper shield to be very thin.

11 Claims, 17 Drawing Sheets

METHOD FOR MANUFACTURING A MAGNETORESISTIVE SENSOR HAVING A FLAT SHIELD

FIELD OF THE INVENTION

The present invention relates to magnetoresistive sensors and more particularly to a sensor having manufactured by a process that results in a flat upper shield/lead structure and well defined sensor thickness.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least a coil and first and second pole piece layers separated by a gap layer at an air bearing surface (ABS) of the write head. Current conducted through the coil induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs, a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for passing an electrical sense current through the sensor. Magnetic shields are positioned above and below the sensor stack and can also serve as first and second electrical leads, so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

In the push to increase data density and sensor performance, researchers have sought to develop magnetoresistive sensors having ever increased sensitivity and reduced size. Manufacturing methods that adequately defined sensors at larger dimensions become inadequate at very small dimensions. For example, prior art manufacturing methods result in a sensor and upper shield that are formed with a notch that, at very small sensor sizes, resulting in unacceptable performance degradation.

SUMMARY OF THE INVENTION

The present invention provides a method for manufacturing a magnetoresistive sensor. The method includes providing a substrate and depositing a plurality of sensor layers over the substrate. A thin high density carbon CMP stop layer is deposited over the plurality of sensor layers, and a mask is formed over the thin high density carbon CMP stop layer. The image of the mask structure is transferred onto the thin high density carbon CMP stop layer and an ion milling is performed to remove a portion of the plurality of sensor layers that are not protected by the mask and the thin high density carbon CMP stop layer. A layer of hard magnetic bias material is deposited, and a chemical mechanical polishing process is performed to remove the mask structure. A reactive ion etching is performed to remove the thin high density carbon CMP stop layer.

An optional second layer of thin high density carbon CMP stop material can be deposited after the hard magnetic bias layer has been deposited. Also, a thin insulating layer such as alumina can be deposited prior to depositing the hard magnetic bias material.

Because the CMP top layer (or layers) is very dense and hard, it can be deposited much thin than would be possible with other materials while still being able to withstand the chemical mechanical polishing. This thinness means that after the CMP stop layer has been removed, there will be very little notching above the sensor. This in turn results in a much flatter trialing shield.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
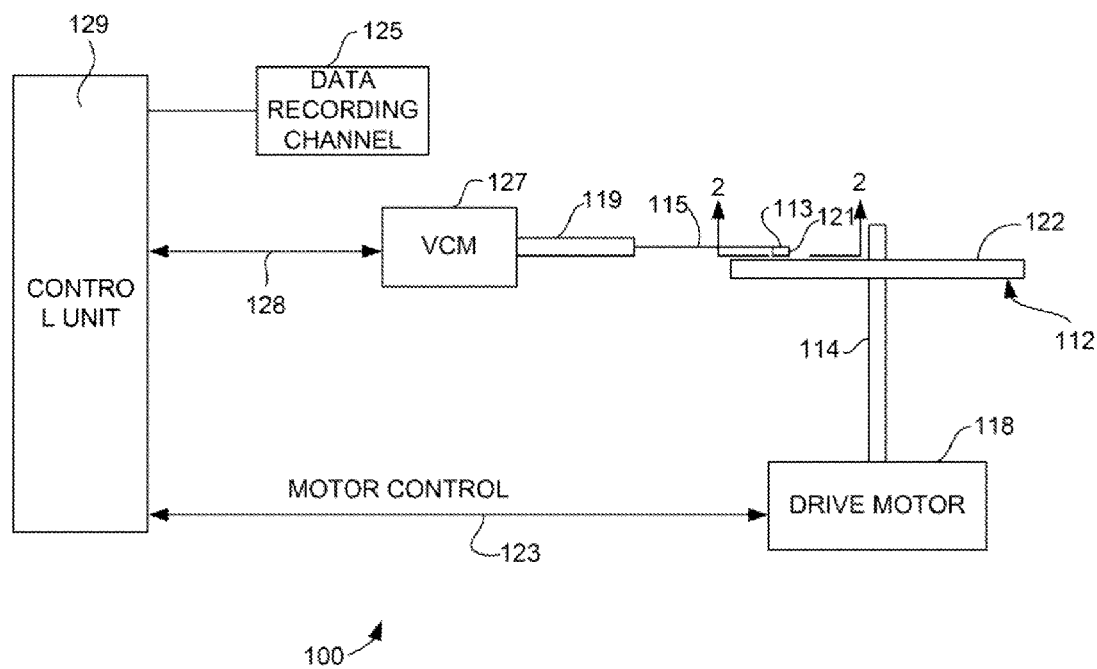
FIG. 1 is a schematic illustration of a disk drive system in which the invention might be embodied.

Referring now to FIG. 1, there is shown a disk drive 100 embodying this invention. As shown in FIG. 1 at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
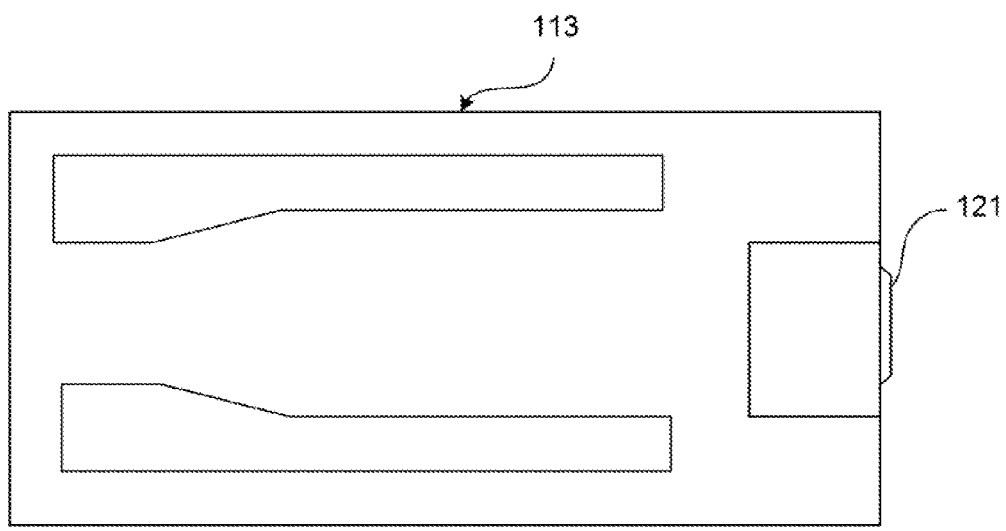
FIG. 2 is an ABS view of a slider illustrating the location of a magnetic head thereon.
Figure 3:
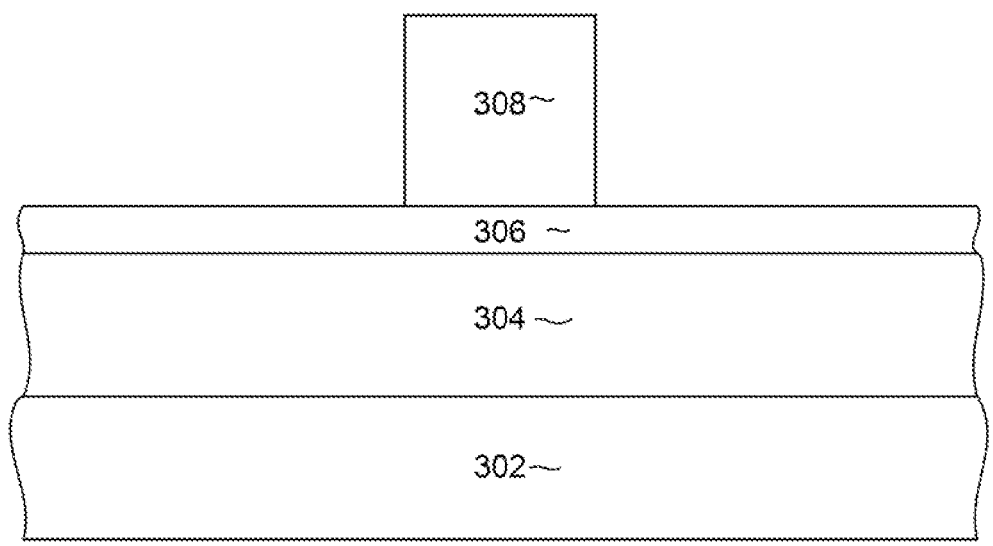
FIGS. 3-6 are enlarged ABS views of a magnetoresistive sensor in various intermediate stages of manufacture, illustrating a method for manufacturing a sensor according to the prior art.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 4:
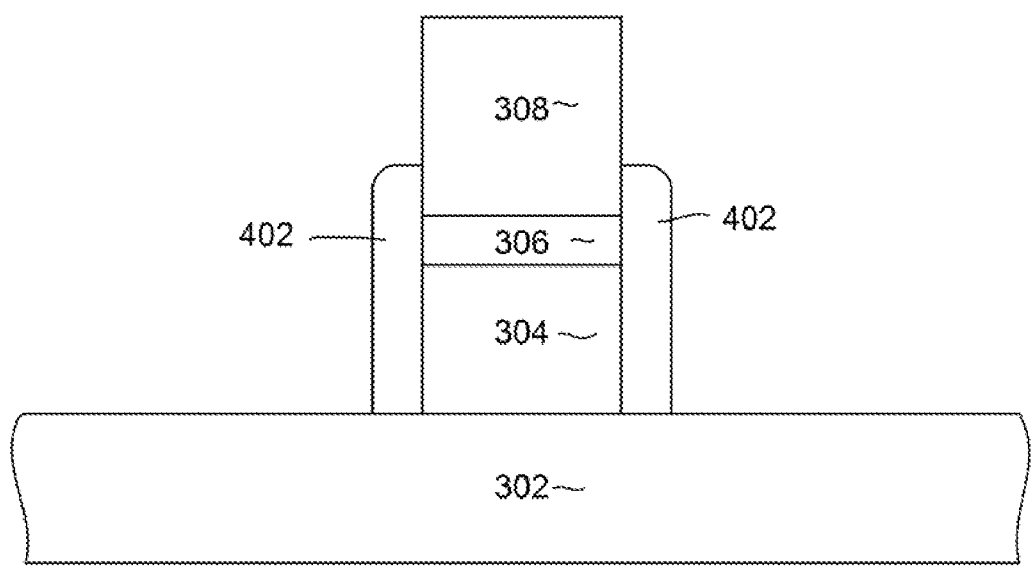
Figure 5:
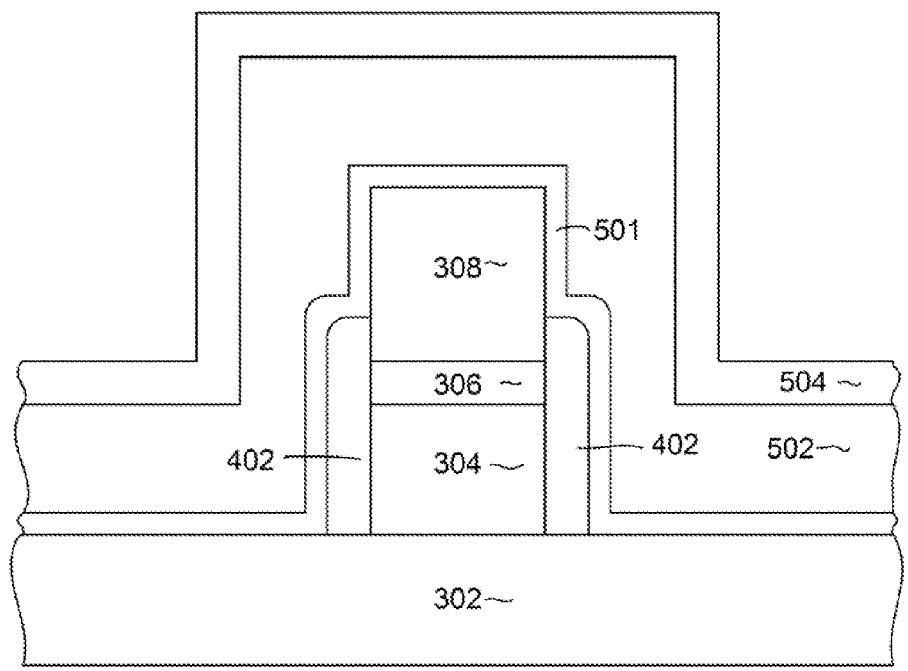
Figure 6:
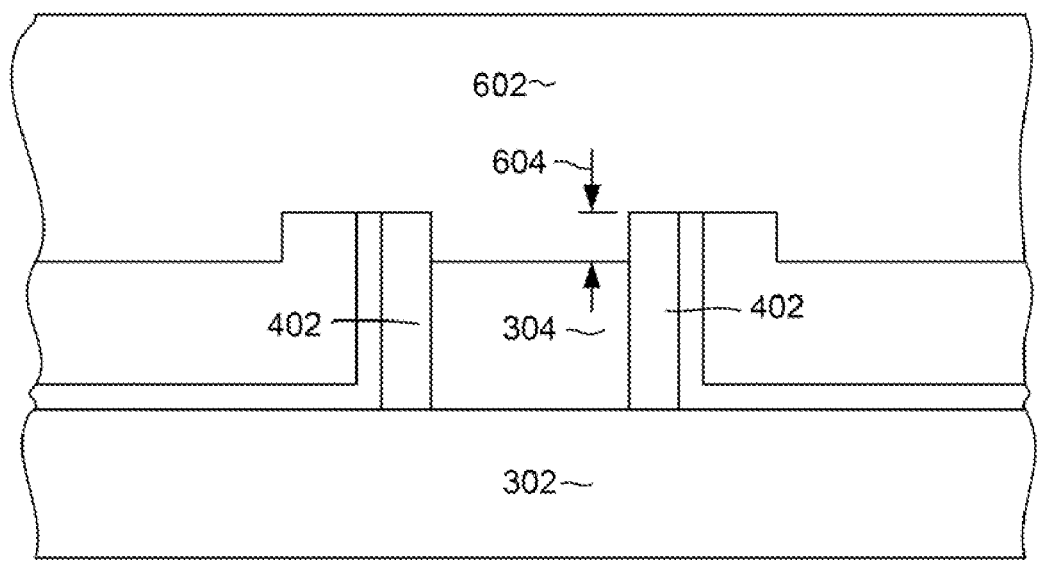

FIGS. 3-6 illustrate a prior art method for manufacturing a magnetoresistive sensor and the associated challenges that arise there from. The method begins by depositing a series of sensor layers 304 onto a substrate and then depositing a thick CMP stop layer 306 onto the sensor layers. A mask 308 is formed over the CMP stop layer 306. Then, an ion milling is performed to remove portions of the sensor layers 304 that are not protected by the mask 308, as shown in FIG. 4. The ion milling also results in a certain amount of re-deposited material (redep) 402 being formed on the sides of the sensor 304 and CMP stop layer 306. Then, an insulation layer such as alumina 501 and hard bias layer 502 are deposited, follow by another thick CMP stop layer 504, resulting in a structure as shown in FIG. 5. Then, a chemical mechanical polishing (CMP) is performed to remove the mask 308, and a process such as reactive ion etching is performed to remove the remaining CMP stop layers 306, 504. An electrically conductive, magnetic shield 602 is then formed over the structure as shown in FIG. 6.

As can be seen in FIG. 6, the process described above results in a large notch 604 being formed at the top of the sensor 304. This causes the shield 602 to have an inconsistent, non-flat shape and results in poor performance and poor control of sensor thickness or "gap". In addition, it can be seen that the large amount of re-dep 402 remains at the sides of the sensor and is not removed by the chemical mechanical polishing. The present invention, which is described below, addresses this issue, providing a method for constructing a sensor with a flat shield for excellent gap thickness control and exceptional performance.

Figure 7:
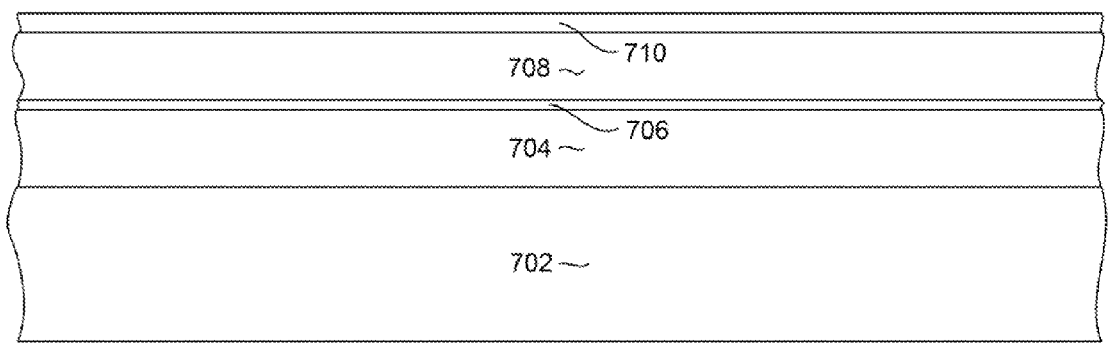
FIGS. 7-17 are ABS views of a magnetoresistive sensor in various intermediate stages of manufacture illustrating a method of manufacturing a magnetoresistive sensor according to an alternate embodiment of the invention.

FIGS. 7-17 illustrate a method for manufacturing a sensor according to an embodiment of the invention. With reference now to FIG. 7, an electrically conductive, magnetic bottom shield 702 is provided. This can be formed on a substrate which is not shown in FIG. 7. A series of magnetoresistive sensor layers 704 are deposited over the shield 702. A first layer of material that is resistant to chemical mechanical polishing (CMP stop layer) 706 is deposited over the sensor layers 704. One or more masking layers are deposited over the CMP stop layer 706. The masking layers can include an image transfer layer 708 and a layer of photoresist 710 deposited over the image transfer layer. The image transfer layer can be a soluble polymer such as DURIMIDE® or can be some other similar, suitable material. Other masking layers, such as but not limited to one or more hard mask layers, a bottom antireflective coating (BARC) and or a release layer can also be provided in the masking layers, but are not shown in FIG. 7.

Figure 17:
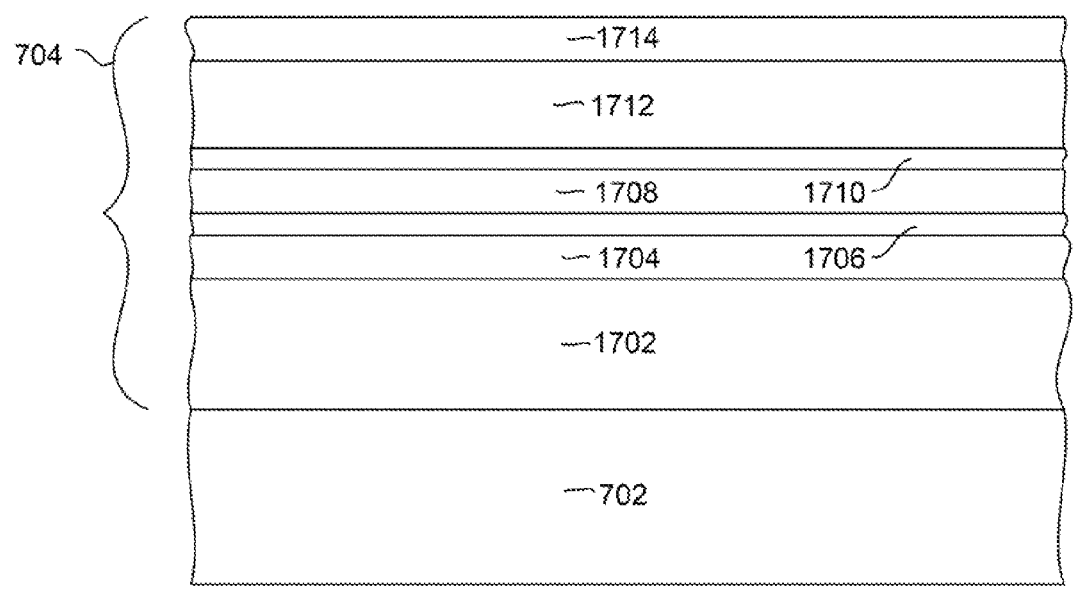

The sensor layers 704 are shown as a whole in FIG. 7. However, those skilled in the art will appreciate that the sensor layers 704 actually include various magnetic and non-magnetic layers. FIG. 17 shows the series of sensor layers 704 in greater detail and illustrates a possible arrangement of deposited sensor layers. These sensor layers 704 may include a layer of antiferromagnetic material such as PtMn or IrMn (AFM) 1702. A first magnetic pinned layer AP1 1704 is deposited over the AFM layer 1702, a thin non-magnetic antiparallel coupling layer such as Ru 1706 is deposited over the AP1 layer and a second magnetic pinned layer 1708 is deposited over the antiparallel coupling layer 1706. A non-magnetic spacer or barrier layer 1710 is deposited over the AP2 layer 1708 and a magnetic free layer 1712 is deposited over the non-magnetic layer 1710. A capping layer 1714 constructed of a material such as Ta (as well as other possible layers) is deposited over the free layer.

With reference again to FIG. 7, the chemical mechanical polishing resistant layer (CMP stop layer) 706 is preferably constructed of a high density carbon layer. The high density of this carbon layer, allows the layer to be thinner than previously used CMP stop layers and thinner than a standard diamond like carbon (DLC) layer. The CMP stop layer 706 is preferably deposited to a thickness of only 10-15 nm or about 13 nm. This reduced thickness advantageously minimizes upper shield notching, as will become apparent below.

Carbon, when formed in a high density, amorphous structure has unique properties. Unlike typical metals or ceramics, it offers better wear resistance and lower coefficient of friction at the same time. A combination of low resistance to wear and low friction is a very attractive attribute as a chemical mechanical polishing (MP) stop layer in that it enables the CMP stop layer 706 to be very thin, while generating less mechanical shear for the areas it is protecting. Amorphous carbon can have a density of between 1.5 and 3.3 g/cc and hardness of 10 to 40 GPa. These can be achieved while also having a coefficient of friction that is only 0.1. In addition; the surface energy of amorphous carbon can be as low as that of TEFLON® with a surface contact angle of 70 to 115 degrees, depending on the process conditions with which it is formed. The high density of amorphous carbon also enables it to protect against chemical penetration of the CMP slurry to prevent chemical attack to the protected structure. All of these properties are favorable to stop Chemical Mechanical Polishing (CMP) both chemically and mechanically where it is not intended while exposing other areas for chemical/mechanical actions for controlled stock removal. These above described properties of high density amorphous carbon allow the CMP stop layer 706 to be very thin, while still withstanding the chemical mechanical polishing.

The CMP process is modified to accommodate the reduction in stop layer thickness without resulting in over-polishing. The CMP process which needs to be aggressive enough to lift-off the photo-resist is segregated into multiple steps with an aggressive step used for liftoff followed by gentle polishing steps for planarization and cleaning. This breaking up of CMP steps helps prevent over-polishing of the CMP stop layer which protects the sensor and hard bias while resulting in a reduced notch height.

Figure 8:
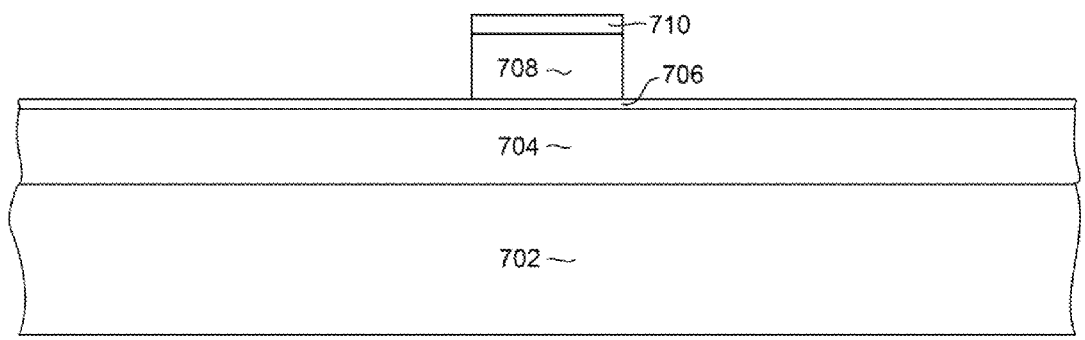

With reference now to FIG. 8 the photoresist layer 710 such as JSR 1891-30N® or some other similar suitable material is photolithographically patterned and developed to form a desired photoresist mask 710 having a shape that is configured to define a magnetoresistive sensor. JSR 1891-30N is non-silicon containing. When used to form a stencil consisting of carbon/Durimide/JSR 1891-30N would allow RIE slimming to form a narrower trackwidth. RIE etch rates of the individual materials in the stencil are similar, which produces a smooth stencil for ion milling. Then, a reactive ion etching is performed to transfer the image of the photoresist mask onto the underlying image transfer layer 708 and CMP stop layer 706 leaving a structure as that shown in FIG. 9. This reactive ion etching can be performed in an oxygen containing chemistry such as $O_2$ and $CO_2$ chemistries.

Figure 9:
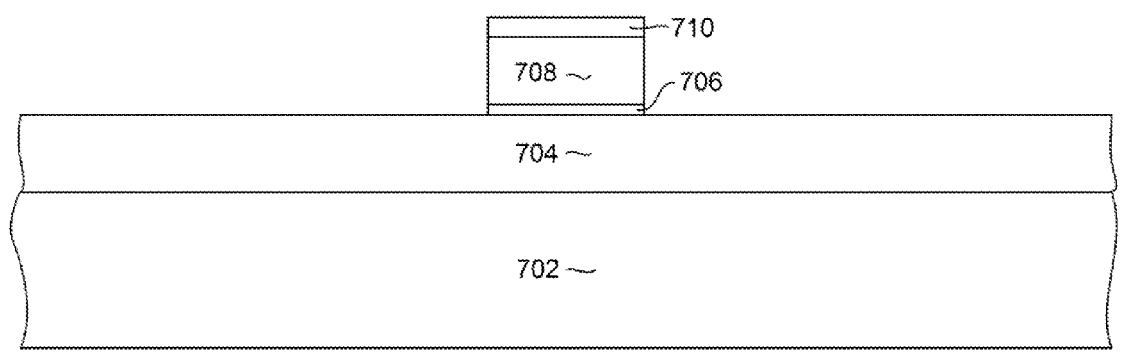
Figure 10:
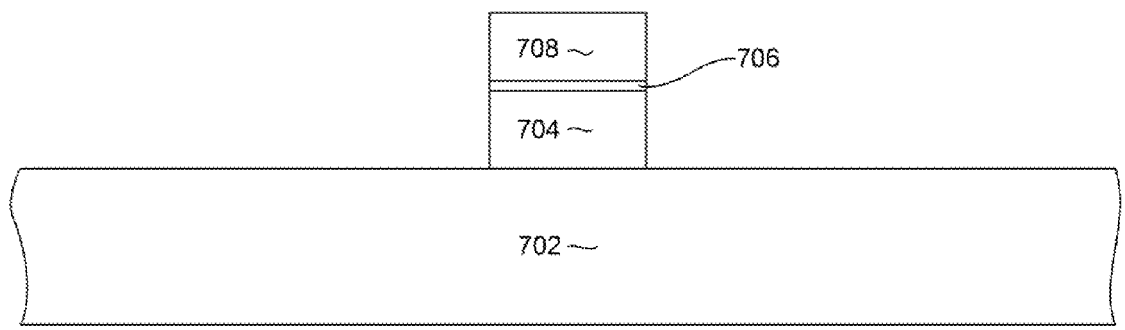

With reference now to FIG. 10 an ion milling is performed to remove portions of the sensor material 704 that are not protected by the mask layer 708 in order to define a sensor 704. In the process of ion milling to remove the desired portions of the sensor layer 704, a certain amount of re-deposited material (re-dep) 1002 may form on the sides of layer 710 (FIG. 9). Since the re-dep is localized to the side of 710, a thinner layer 710 minimizes this re-dep. The ion milling may actually include one or more ion millings performed at various angles relative to normal in order to optimize the definition of the side walls, and also to minimize the amount of re-dep 1002 formed on the sides of the sensor 704.

Figure 11:
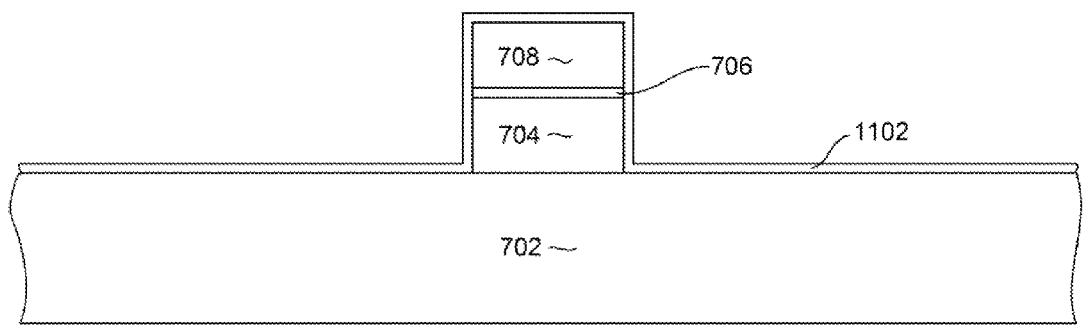
Figure 12:
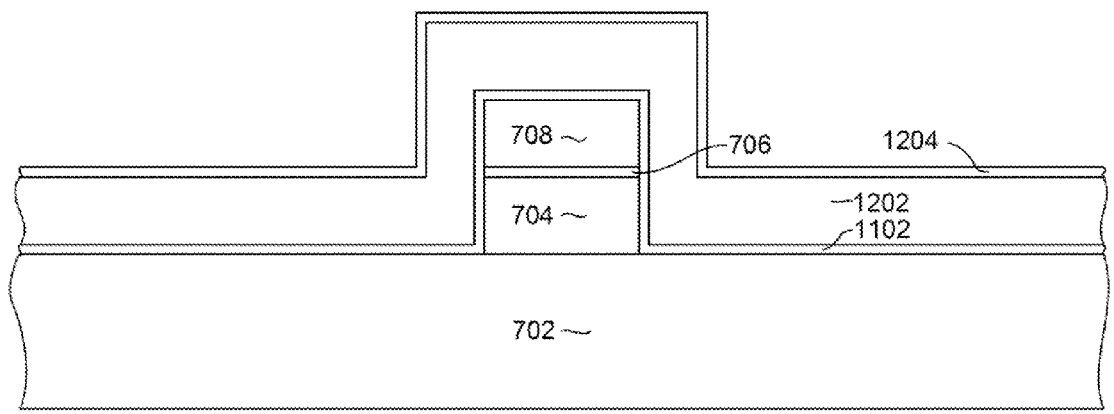
Figure 13:
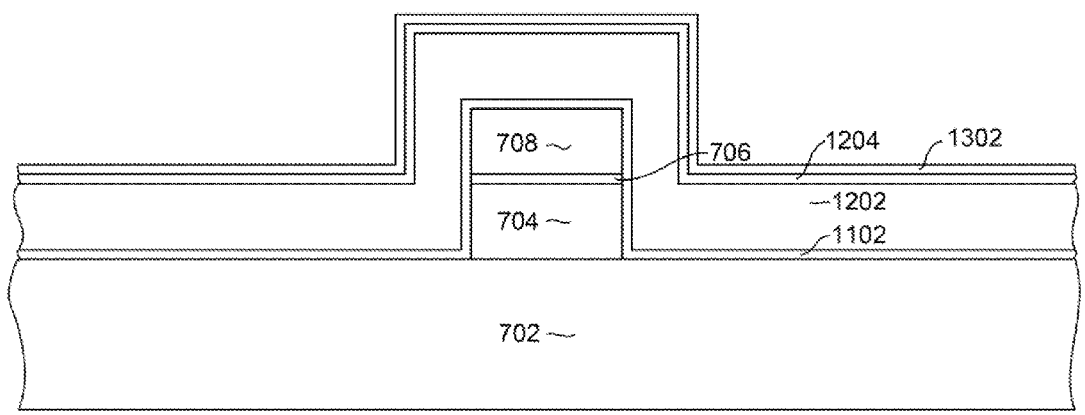

Then, with reference to FIG. 11, a thin insulation layer 1102 is deposited. This insulation layer 1102 is preferably alumina ($Al_2O_3$) and is preferably deposited by a conformal deposition process such as atomic layer deposition (ALD). Then, a layer of hard magnetic material (hard bias layer) 1202 is deposited. This layer 1202 is preferably constructed of a magnetic material having a high magnetic moment such as CoPt or CoPtCr, that is sandwiched between a seed layer consisting of NiTa/CrMo and a cap layer 1204 is deposited over the hard bias layer 1202. The cap layer is preferably a multi-layer structure that includes a layer of material that is resistant to chemical mechanical polishing. For example the cap layer 1204 can include a layer of Ta with a layer of Cr thereover (Ta/Cr), a layer of Ta with a layer of Ir thereover (TaIr), or could be Ta/Rh, Ta/Ru, etc. Cr, Ir, Rh, Ru, etc are used as CMP stop layer. Adding the CMP resistant layer (e.g. Cr, Ta, Ir, Rh or Ru) allows the capping layer to be much thinner than would otherwise be possible, which results in flatter upper shield as will be apparent below. The layer 1202 is preferably deposited about to the height of the top of the sensor layer 704. The deposition angle of the seed layer and magnetic material is desirable between 70-90 degree while the cap optimal angle is between 50-70 degrees. An optional second layer of CMP resistant material ($2^{nd}$ CMP stop layer) 1302 may then be deposited over the hard bias layer 1202 as shown in FIG. 13. This second CMP stop layer 1302 is also preferably constructed of a high density carbon material, allowing it to be deposited thinner than a conventional diamond like carbon while still providing adequate protection of the hard bias layer 1202 during CMP.

Figure 14:
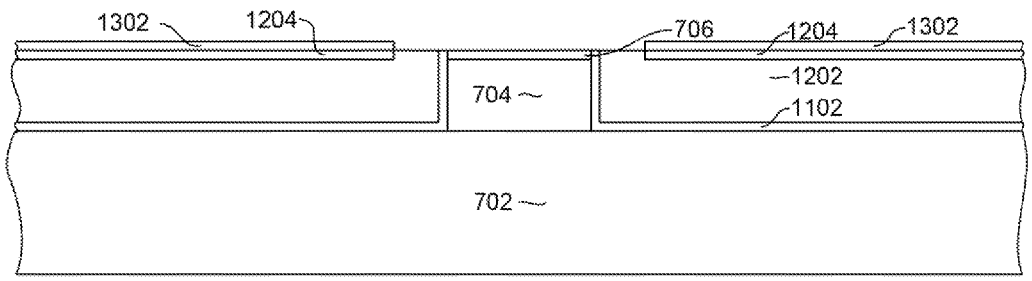
Figure 15:
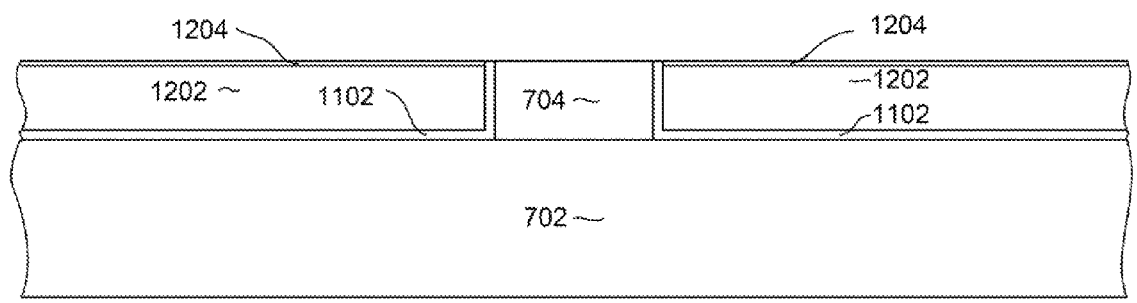
Figure 16:
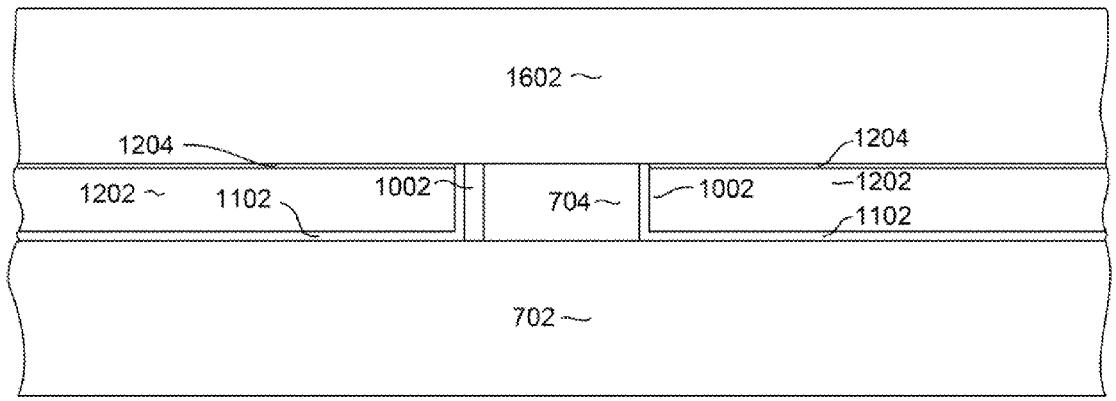

A chemical mechanical polishing (CMP) is then performed to remove the mask layer 708, leaving a structure such as that shown in FIG. 14. The CMP stops at the first and second CMP stop layers 706, 1204, which as mentioned above are resistant to CMP. This CMP is a multi-step CMP, and includes a more aggressive first CMP step to remove the mask 708 and a second less aggressive gentler CMP to smoothen and clean the structure. Then, another reactive ion etching (preferably performed in a chemistry such as $O_2$ or $CO_2$) is performed to remove any remaining CMP stop material 706, 1302, leaving a structure as shown in FIG. 15.

Then, a second magnetic shield 1602 is formed over the sensor layer 704 and hard bias layers 1202. This can be performed by depositing a seed layer, forming an electroplating frame mask, electroplating a magnetic material into an opening in the mask, removing the mask and performing a quick ion milling to remove residual seed material. The above described process, which uses thinner denser CMP stop layers 706, 1204 (FIG. 14) results in a greatly reduced notch height 1604 and, therefore, results in a much flatter, more uniform shield structure 1602.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetoresistive sensor, comprising:
   providing a substrate;
   depositing a plurality of sensor layers over the substrate;
   depositing a first thin high density carbon CMP stop layer over the plurality of sensor layers;
   forming a mask structure over the thin high density carbon CMP stop layer;
   transferring an image of the mask structure onto the thin high density carbon CMP stop layer;

performing an ion milling to remove a portion of the plurality of sensor layers that are not protected by the mask and the thin high density carbon CMP stop layer;

depositing a layer of hard magnetic bias material;

depositing a capping layer over the hard bias material, the capping layer comprising a layer of Ta and at least one layer of Cr or Rh;

depositing second high density carbon CMP stop layer;

performing a chemical mechanical polishing to remove the mask structure, the chemical mechanical polishing including a first CMP step followed by a second CMP step, the first CMP step being more aggressive than the second CMP step; and performing a reactive ion etching to remove the first and second thin high density carbon CMP stop layer.

2. The method as in claim 1 wherein the first and second thin high density carbon CMP stop layers have a thickness of less than 75 Angstroms.

3. The method as in claim 1 wherein the first and second thin high density carbon CMP stop layers have a density of 1.5-3.3 g/cc.

4. The method as in claim 1 wherein the first and second thin high density carbon CMP stop layers have a hardness of 10 to 40 GPa.

5. The method as in claim 1 wherein the first and second thin high density carbon CMP stop layers have a coefficient of friction of 0.1.

6. The method as in claim 1 wherein the first and second thin high density carbon CMP stop layers have a surface contact angle of 70-115 degrees.

7. The method as in claim 1 wherein the reactive ion etching is performed in a chemistry that includes $CO_2$ or $O_2$.

8. The method as in claim 1 further comprising after performing the reactive ion etching, depositing a magnetic, electrically conductive shield.

9. The method as in claim 1 further comprising after performing the ion milling, and before depositing the magnetic hard bias material, depositing a thin electrically insulating layer.

10. The method as in claim 9 wherein the thin electrically insulating layer comprises alumina and is deposited by atomic layer deposition.

11. The method as in claim 1 wherein the first and second thin high density carbon CMP stop layers are each high density amorphous carbon.

\* \* \* \* \*

UNITED STATES PATENT AND TRADEMARK OFFICE
CERTIFICATE OF CORRECTION

PATENT NO. : 8,296,930 B2  
APPLICATION NO. : 12/645323  
DATED : October 30, 2012  
INVENTOR(S) : Funada et al.

Page 1 of 1

It is certified that error appears in the above-identified patent and that said Letters Patent is hereby corrected as shown below:

On the Title page, item (56), References Cited:

Please replace "2006/0136543 Lutz et al." with --2006/0132983 Osugi et al.--

On the Title page, item (57), Abstract, line 14:

Please insert --(deposited there-over)-- after 'the upper shield' and before "to be very thin."

Signed and Sealed this  
Ninth Day of April, 2013

Teresa Stanek Rea  
*Acting Director of the United States Patent and Trademark Office*